US012077924B2

(12) United States Patent
Rauer et al.

(10) Patent No.: US 12,077,924 B2
(45) Date of Patent: Sep. 3, 2024

(54) PASSAGE CONTROL DEVICE

(71) Applicant: Magnetic Autocontrol GmbH, Schopfheim (DE)

(72) Inventors: Timo Rauer, Rheinfelden (DE); Martin Steiert, Wehr (DE)

(73) Assignee: Magnetic Autocontrol GmbH, Schopfheim (DE)

( * ) Notice: Subject to any disclaimer, the term of this patent is extended or adjusted under 35 U.S.C. 154(b) by 91 days.

(21) Appl. No.: 17/628,285

(22) PCT Filed: Jun. 26, 2020

(86) PCT No.: PCT/EP2020/068147

§ 371 (c)(1),
(2) Date: Jan. 19, 2022

(87) PCT Pub. No.: WO2021/013473

PCT Pub. Date: Jan. 28, 2021

(65) Prior Publication Data

US 2022/0267972 A1 Aug. 25, 2022

(30) Foreign Application Priority Data

Jul. 22, 2019 (DE) ......................... 202019104046.7

(51) Int. Cl.
*E01F 13/02* (2006.01)
*E04F 11/18* (2006.01)
(Continued)

(52) U.S. Cl.
CPC ........ *E01F 13/022* (2013.01); *E04F 11/1851* (2013.01); *E05F 15/00* (2013.01);
(Continued)

(58) Field of Classification Search
CPC ................. E01F 13/022; E04F 11/1851; E04F 2011/1868; E05F 15/00; E05Y 2201/422; E05Y 2900/40; G07C 9/15
(Continued)

(56) References Cited

U.S. PATENT DOCUMENTS 8,127,492 B1 3/2012 Hellman, Sr. et al.
2006/0027649 A1 2/2006 Kocznar et al.
(Continued)

FOREIGN PATENT DOCUMENTS

CN 101063884 B 8/2012
CN 102819882 B 5/2015
(Continued)

*Primary Examiner* — Mark R Wendell
(74) *Attorney, Agent, or Firm* — Volpe Koenig

(57) ABSTRACT

A passage control device having a corridor (1) and at least one pedestrian barrier (3), which, by the use of at least one blocking element (5) which is arranged in the region of the corridor (1) and can be moved between a blocking position and a passage position, releases or blocks the corridor (1) for a passage. Lateral boundaries (2) are arranged right and left of the corridor (1). The lateral boundaries (2) have a module rail (6) that is close to the ground and is provided with receptacles for functional elements and/or functional modules of the access control device, more particularly with specifically adapted receptacles for functional elements and/or functional modules of the access control device, preferably in a predefined grid.

20 Claims, 9 Drawing Sheets

(51) Int. Cl.
*E05F 15/00* (2015.01)
*G07C 9/15* (2020.01)

(52) U.S. Cl.
CPC ........ *G07C 9/15* (2020.01); *E04F 2011/1868* (2013.01); *E05Y 2201/422* (2013.01); *E05Y 2900/40* (2013.01)

(58) Field of Classification Search
USPC ............................................................ 52/174
See application file for complete search history.

(56) References Cited

U.S. PATENT DOCUMENTS

| | | | |
|---|---|---|---|
| 2007/0233323 | A1 | 10/2007 | Wiemeyer et al. |
| 2007/0271846 | A1 | 11/2007 | Miller et al. |
| 2013/0120108 | A1 | 5/2013 | Kocznar et al. |
| 2016/0002955 | A1 | 1/2016 | Smith et al. |

FOREIGN PATENT DOCUMENTS

| | | |
|---|---|---|
| CN | 107909751 | 4/2018 |
| CN | 109785493 B | 8/2021 |
| EP | 3309756 | 4/2018 |
| EP | 3483382 | 5/2019 |
| JP | H10124710 A | 5/1998 |
| WO | 2010078856 | 7/2010 |
| WO | 2012052808 | 4/2012 |

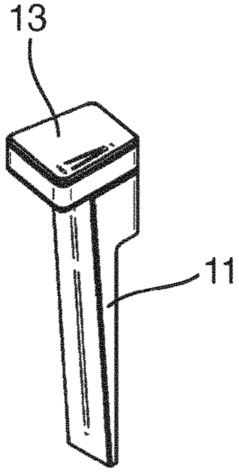
Fig. 6A
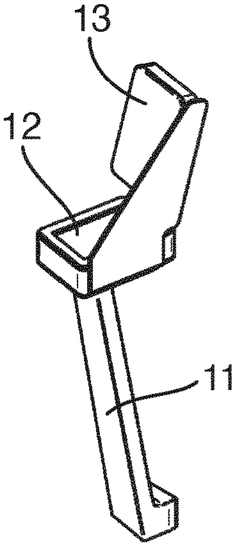
Fig. 6B
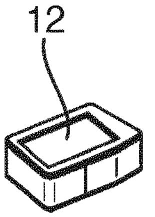
Fig. 6c
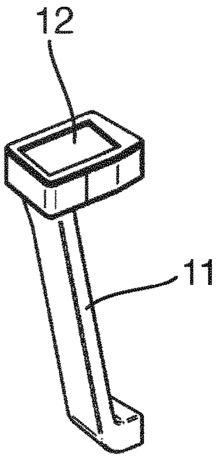
Fig. 6D
Fig. 7
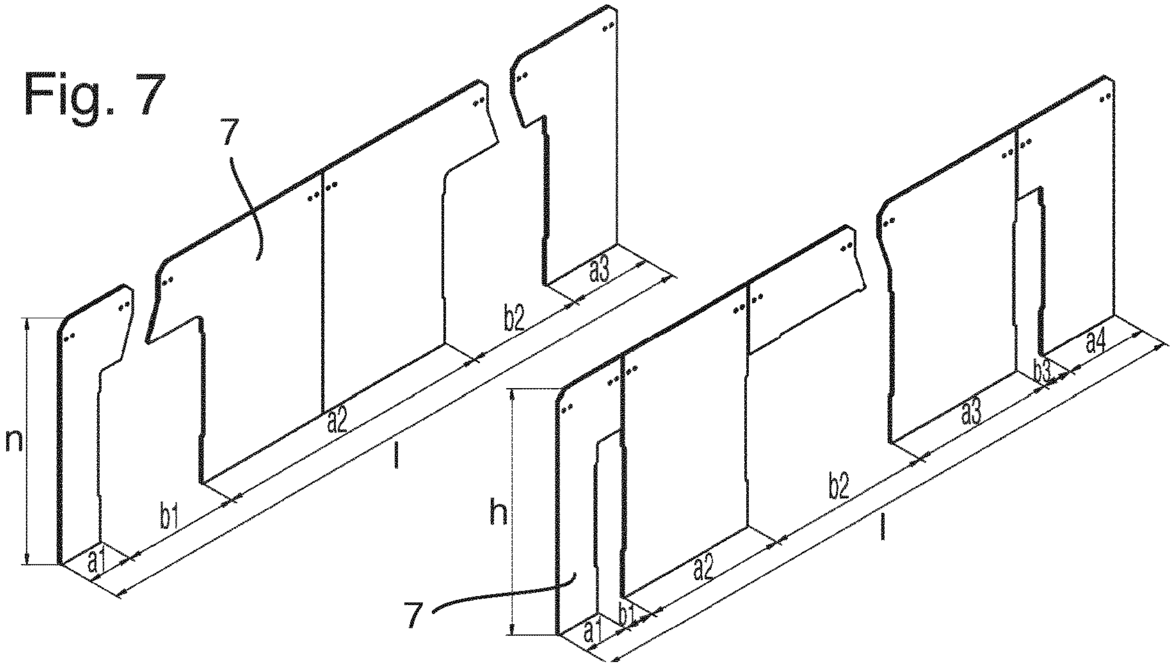

PASSAGE CONTROL DEVICE

TECHNICAL FIELD

The invention relates to a passage control device having a corridor and at least one pedestrian barrier which releases or blocks the corridor for passage, and also having lateral boundaries disposed on the right and the left of the corridor, according to the preamble of claim 1. The pedestrian barrier of such a passage control device contains at least one blocking element, which is disposed in the region of the corridor and can be moved between a blocking position and a passing position.

BACKGROUND

A pedestrian barrier present in such a passage control device usually comprises two blocking elements which on the right and the left of the corridor are fastened to the lateral boundaries and in the blocking position of said blocking elements block in each case only approximately half the width of the corridor. In particular when the blocking elements are pivoted about a vertical axis of rotation between the blocking position and the passing position and consist of pane elements of a relatively large area, advantages emerge as a result of the approximately 50/50 division because lower bearing forces result and counter-torques during the pivoting due to the air resistance and due to moments of inertia are significantly reduced. Nevertheless, the present invention is not restricted to pedestrian barriers of such a configuration but can be equipped with a wide variety of pedestrian barriers such as leaves, which are pivoted about a horizontal pivot axis into the corridor and out of the latter, rotating leaves, or triple-sector barriers.

Pedestrian barriers and passage control devices of the present type are found in many application sectors in which specially secured zones are intended to be accessible to people but this access has to take place in a controlled manner. One function of the passage control device here lies in singularizing the people seeking access to a protected or controlled zone through the corridor of the passage control device. This is often the primary function in the case of concerts and sporting events as well as at checkout terminals of supermarkets, or else when leaving and entering particularly protected zones such as the gate area of an airport. A further function of such a passage control device is important for protected zones that must be entered only with specific authorization. Such a specific authorization may be an entry ticket, a membership card, a passport, or—in airports—a boarding pass; authorization here may also be the availability of biometric data by way of which a person authorized for access can be unequivocally identified.

Such specific authorizations are checked in particular with scanning apparatuses at passage control devices of the present type, and the pedestrian barrier, or the blocking element thereof, is pivoted from the blocking position to the passing position or else remains in the blocking position as a function of the checking result. Passage control devices of this type are known from WO 2010/078856 A1, for example.

Above all in passage control devices for protected zones through which a multiplicity of people are to be shepherded in the shortest possible time, as is the case in particular in airports, it has proven successful to dispose a plurality of passage control devices next to one another, wherein the left lateral boundary of the corridor of a first passage control device is simultaneously the right lateral boundary of the corridor of a second passage control device. Such a mutual utilization of lateral boundaries optimizes the space requirement for the passage control devices.

Above all in the sector of air travel security, and in the latter in particular at the so-called boarding gates and at the departure and arrival checks customary at border control, there is a high demand for passage control devices of the present type, wherein the latter have to be equipped with different functional elements depending on the specific application. Apart from scanning apparatuses, such as scanners for a boarding pass and/or a passport, said functional elements also include scanning apparatuses having detection means for biometric data, such as cameras for facial recognition, scanners for fingerprints and iris recognition, and the like. Further functional elements are sensors, such as light barriers, ultrasonic sensors and the like, which detect whether a person or an object is present in the pivoting area of the blocking element, and can in particular locate people and objects, such as suitcases, in the interior of a manlock formed by two pedestrian barriers in one and the same passage control device, so that a control unit, the latter representing a further functional element, can guarantee orderly procedure when passing, or else when denying passage, and the required singularization of people.

Depending on the national provisions, different requirements are set for a passage control device in particular in safety-relevant zones of airports, said requirements being, for example, the height and resilience of the lateral boundaries, the height and resistance force of the blocking elements and the configuration thereof, the type and functional mode of position recognition sensors, the length and width of the corridor, wherein this list is not exhaustive.

Finally, airports are specifically the subject of ongoing changes that not only relate to the safety provisions but also to the structural conditions, such that passage control devices typically do not remain in place over several years but have to be regularly adapted to the changes, either by changing the location or by expanding the functions by means of additional functional elements.

In order to solve the issue that passage control devices of the type mentioned at the outset have to be rearranged or changed in terms of their position from time to time, in particular at airports, it has been proposed in WO 2012/052808 A1 to construct a passage control device in a modular manner to the extent that the individual functional elements are designed as functional modules, such as a scanner unit, a door module, a face recognition unit and a floor sensor installation. These are attached to a main body so as to be able to be folded into and out of the latter, and fixed during operation. It is thus enabled that a passage control device is rendered flexible to a certain extent.

SUMMARY

The present invention is based on the object of constructing in a modular manner a passage control device of the type described above in such a way that said passage control device is able to be adapted to different requirements in a more flexible manner.

This object is achieved by a passage control device having one or more of the features described herein. Preferred design embodiments and refinements of the passage control device according to the invention are found below and in the claims. The object is also achieved by a parts kit for a passage control device having one or more of the features described herein, wherein a preferred refinement of this parts kit is also set forth below.

A passage control device of the type mentioned at the outset is modified according to the invention in such a way that the lateral boundaries have a floor-proximal module rail which, preferably at a predefined pitch, is provided with respectively specifically adapted receptacles for functional elements and/or functional modules of the access control device. This module rail forms a type of modular main support for all, or at least most, of the functional elements, which preferably as far as possible are designed as functional modules.

Functional modules not only facilitate the production of the passage control device according to the invention, but also enable ready adaptability of an already installed passage control device which is to be retrofitted with further functional elements, for example. Said retrofitting can be the additional attachment of functional modules, such as a second pedestrian barrier or a further scanning apparatus for recognizing biometric data, or a modified and expanded control module, and also additional position or safety sensors. However, the replacement of already existing functional modules by modified functional modules is also possible, such as for example higher lateral boundaries, blocking elements with a larger area, or a control cabinet of larger dimension for receiving the electrical equipment required for additional functional elements.

This modular construction according to the invention is enabled by the module rail, which is typically placed on the floor and is part of the lateral boundary, because said module rail is provided with a respectively specifically adapted receptacle, in particular at a predefined pitch, for the functional elements or functional modules of the access control device.

The pitch in the module rail that is preferably predefined at least for selected functional elements offers particular advantages when the module rail is provided with at least one sensor receptacle for equidistantly disposed sensors and/or radiation sources, such as, in particular, light barriers, ultrasonic sensors and the like. Said sensor receptacle can in this respect be a single sensor receptacle, specifically when it is designed longitudinally along the module rail and a strip having equidistantly disposed sensors or radiation sources is inserted into said sensor receptacle. Alternatively, separate receptacles for individual sensors or radiation sources may be provided in the module rail. The spacing between the equidistantly disposed sensors or radiation sources in this instance preferably forms the pitch dimension for the specifically adapted receptacles for further functional modules or functional elements, because said specifically adapted receptacles in this instance can be attached to the module rail without obscuring a sensor or a radiation source. In this respect, corresponding functional modules or functional elements can be placed substantially between each adjacent pair of sensors or radiation sources, that is to say that this results in great flexibility in terms of the construction of the passage control device along the module rail. For example, a pedestrian barrier can at any time be displaced along the longitudinal extent of the module rail by one pitch dimension or a multiple thereof.

Advantageously, receptacles for functional elements of which the extent in the longitudinal direction of the module rail is larger than the pitch dimension are disposed above the at least one sensor receptacle. This enables such larger functional elements to be attached to the module rail without obscuring even just one position for sensors or radiation sources; the latter in this instance are quite simply situated below the corresponding functional element. An example to this extent is a control cabinet which has to be comparatively large in order for all necessary parts to be able to be accommodated therein.

In the context of the present invention, it is further preferable when the module rail has receptacles for board-shaped or pane-shaped lateral boundary elements. The module rail can then function as the foot of a lateral boundary, the latter being able to be designed having freely shapeable lateral boundary elements. It is thus also possible, for example, for one, two or more pedestrian barriers by way of the stationary part thereof and preferably also the drive thereof to be integrated in the lateral boundary such that this stationary part advantageously occupies little of the available width of the corridor. Since the available with typically has to have a minimum dimension, the latter enables the lateral boundaries to be placed particularly close together on the right and the left of the corridor, this saving installation space in the useful width and, in particular in the case of a passage control station having a multiplicity of passage control devices disposed next to one another, enables an additional one or two passage control devices to be accommodated in the station.

Further particular advantages are provided by the module rail provided according to the invention when the latter has integrated cable ducts. In a simple case, a cable duct can be formed in that the module rail is hollow in the interior thereof, thus in particular is configured as a hollow profile. However, the module rail is preferably configured as a profile which as cable ducts contains specially prepared grooves. This then facilitates the necessary separation of electrical power supply lines (mains cables) from the signal cables which are moreover required.

It is preferable here when the module rail at a predefined pitch is provided with cable conduits or prepared connector locations for connecting to a continuous line. This in turn facilitates the possibly desired relocation of individual functional modules along the module rail because the functional elements or functional modules typically have to be provided with a means voltage and/or signal voltage by means of electrical lines. The module rail provided according to the invention to this extent, for the power supply as well as in terms of the signal routing, forms a cable routing function, optionally also a bus function.

Further advantages are provided when the module rail is provided with anchoring installations for a floor mounting, in particular at a predefined pitch. When the module rail forms the foot of a lateral boundary, it can be provided, for example, that the lower side of said module rail is prepared for adhesive fastening on a floor surface. Alternatively, or else simultaneously, anchoring installations for fastening to a floor surface by plugs can be provided at a predefined pitch. A prepared adhesive fastening renders obsolete the previously commonplace intermediate plate or adhesive plate; a prepared anchoring installation for the anchoring by means of plugs facilitates the mounting in situ, the latter being able to be performed module-by-module by virtue of the modular concept, as well as potentially desirable relocation of the passage control device.

The module rail provided according to the invention can furthermore be provided with receptacles for mounting a console having a reading unit and/or a recognition unit, this too in particular at a predefined pitch. Since reading units in most instances are disposed at the entrance of the corridor of the passage control device, it can be expedient here to dispense with a pitch for a corresponding, specifically adapted receptacle.

The at least one pedestrian barrier, which in the passage control device according to the invention serves for blocking or releasing the corridor, is preferably assembled from a blocking element and an activating element, wherein the activating element preferably comprises a stationary base part having a drive device and a movable holding part to which the blocking element is attached. After all, when the activating element contains an integrated drive device for adjusting the blocking element between the blocking position and the passing position, it is a simple feat to displace the pedestrian barrier along the module rail by a pitch dimension or a multiple thereof, specifically above all when the module rail is provided with integrated cable ducts and to this extent takes on a bus function for the electrical lines required for operating the pedestrian barrier.

The blocking element of the pedestrian barrier preferably configured in such a manner is preferably fastened to the activating element and pivotable by means of the latter between the blocking position and the passing position about a vertical axis of rotation. The blocking element here can be configured such that in a vertical projection it has a substantially rectilinear profile and herein defines a vertical blocking plane which does not include the axis of rotation, this being a particular advantage. In particular, the blocking element is fastened to the activating element eccentrically in terms of the axis of rotation.

This attachment according to the invention of the blocking element to the activating element enables the activating element to be placed very close to a lateral boundary of the corresponding access control device even when component assemblies which are required or advantageous for the operation and are configured as functional modules, for example, or a handrail of the access control device are or is situated in the pivoting region of the blocking element. Since then the blocking plane is spaced apart from the axis of rotation, the blocking element can be fastened to the activating element in such a manner that the blocking plane in the passing position is spaced apart from the axis of rotation in the direction of the center of the corridor, such that the blocking element can be completely open, that is to say can be pivoted by approximately 90° in relation to the blocking position, without butting against a functional module that potentially projects beyond the lateral boundary, or a handrail or the like. It is obvious that the activating element for its part does not have to project beyond the fully open blocking element in the direction toward the center of the corridor, in any case requiring only a smaller protrusion than before, such that the issues outlined at the outset pertaining to a restriction of the passage width, in particular in the case of opposite activating elements, are eliminated to this extent.

Because a pedestrian barrier according to the invention is assembled by way of the two parts fastened to one another, i.e. the blocking element and the activating element, said pedestrian barrier can be put together in such a manner that the pedestrian barrier is selectively pivotable in each of the two rotating directions about the vertical axis of rotation, whereby the advantages according to the invention are achieved.

The module rail provided according to the invention, as mentioned above, at a predefined pitch is preferably provided with receptacles for mounting a drive device and/or the activating element of the pedestrian barrier.

The module rail provided according to the invention is expediently made from an extruded aluminum profile. Such a profile, in particular in the interior thereof, can take a wide variety of cross-sectional shapes in order to receive a plurality of specifically adapted receptacles for functional elements or functional modules and also cable ducts, while said profile in the longitudinal direction is of a substantially uniform shape such that functional modules or functional elements can be easily displaced along the longitudinal direction of the module rail.

Further advantages are provided when the lateral boundaries of the passage control device according to the invention in the region of the upper periphery thereof are provided with a sensor strip. This sensor strip can be configured in a manner identical to that of the module rail, or else have a dedicated profile cross section, this being expedient in most instances. Like the module rail, the sensor strip can also be made from an extruded aluminum profile.

The sensor strip is preferably provided with at least one sensor receptacle for equidistantly disposed sensors and/or radiation sources, such as, in particular, light barriers, ultrasonic sensors and the like. This enables the corridor within the lateral boundaries to be monitored by means of sensor assemblies not only close to the floor but also at the level of a handrail, for example. Such a handrail can preferably be attached to the sensor strip.

The sensor strip also preferably has integrated cable ducts, wherein the latter will be of interest above all for signal cables in order to connect for example a scanner, disposed at the level of a handrail, at the entrance of the corridor to a recognition unit for biometric data toward the end of the corridor and/or to a control unit, which is accommodated in a control cabinet integrated in the lateral boundary.

When one passage control station is formed from at least two passage control devices according to the invention, it is also expedient in the context of the present invention when the left-hand lateral boundary of a first passage control device is at the same time the right-hand lateral boundary of a second passage control device.

BRIEF DESCRIPTION OF THE DRAWINGS

An exemplary embodiment for a passage control device designed according to the invention or for a corresponding parts kit will be described and explained in more detail hereunder by means of the appended drawings in which:

FIGS. 6A to 6D show an enlargement of the illustration of scanning apparatuses, some having the console from FIG. 2;

FIG. 7 shows an enlarged illustration of the lateral boundary elements from FIG. 2;

DETAILED DESCRIPTION

Figure 1:
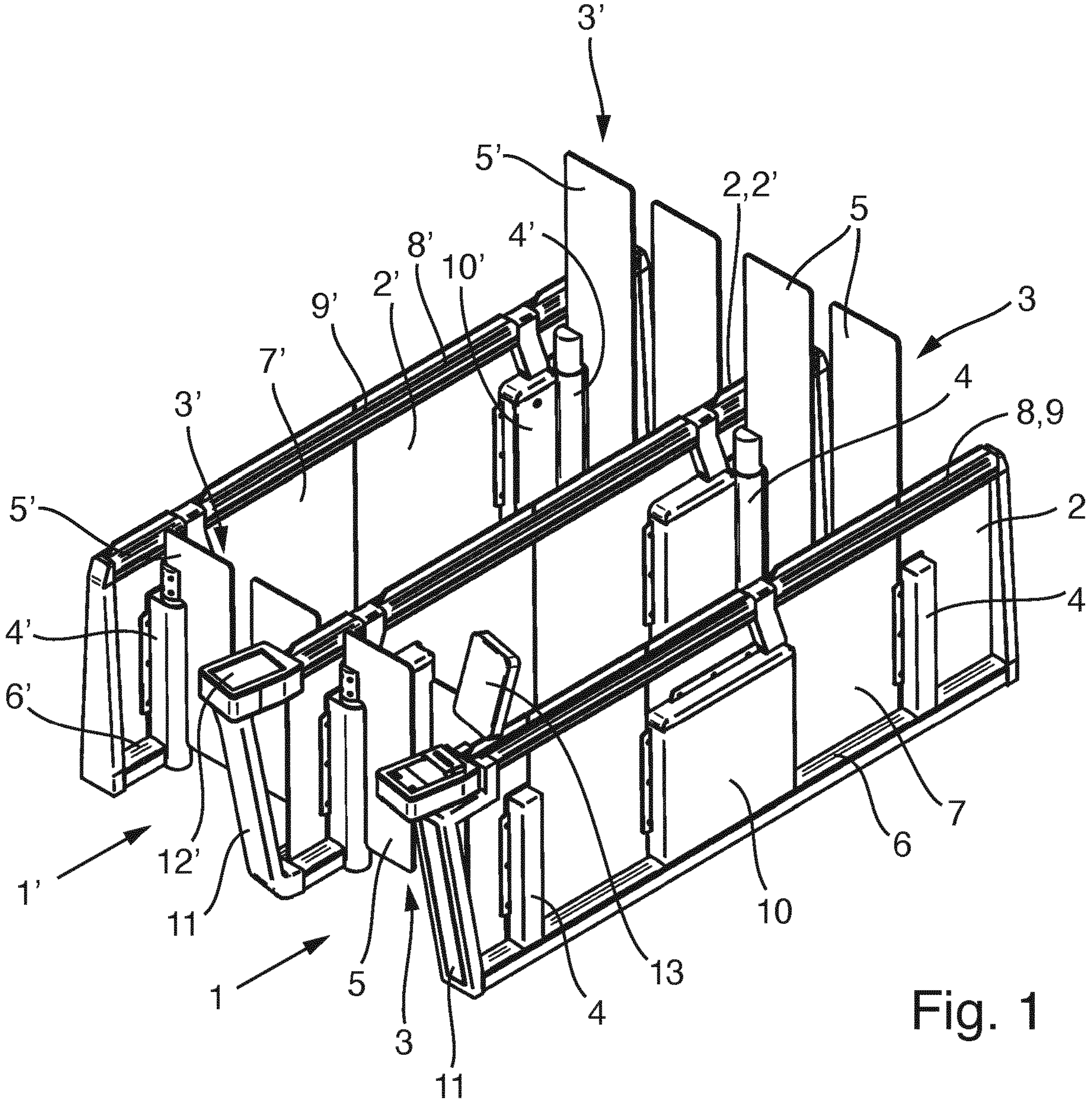
FIG. 1 shows a schematic isometric view of a passage control station having two exemplary embodiments, disposed next to one another, for a passage control device designed according to the invention, in each case being configured as a manlock.

FIG. 1 shows two examples for a passage control device designed according to the invention, having in each case a corridor 1, 1', which is formed by lateral boundaries 2 disposed on the right and the left. For the purpose of forming a passage control station, the two passage control devices are placed next to one another such that the left-hand lateral boundary 2 of the first passage control device, here disposed on the right, is at the same time the right-hand lateral boundary 2' of the second passage control device.

The two passage control devices are provided in each case with two dual-leaf pedestrian barriers 3, 3', wherein a first pedestrian barrier 3, 3' is disposed at the beginning of the corridor while the respective second pedestrian barrier 3, 3' is situated at the end of the corridor 1. The passage control devices are thus designed as locks and access to the lock as well as the exit therefrom is controlled, wherein the pedestrian barrier 3 disposed at the end of the corridor 1 opens at the earliest when the pedestrian barrier 3 disposed at the beginning of the corridor 1 has been closed again once a person has passed through.

The pedestrian barriers 3, 3' consist in each case of an activating element 4 integrated in the lateral boundary 2 and a blocking element 5, attached thereto, on each side, that is to say that said pedestrian barriers are dual-leaf pedestrian barriers 3, 3' which in a blocking position (shown in FIG. 1) block in each case approximately half of the corridor 1. The blocking elements 5, 5, by means of being pivoted about a vertical pivot axis, are pivoted by approximately 90° to a passing position, as a result of which said blocking elements 5, 5' release the corridor 1 for passage. As an anti-pinch feature, the two blocking elements 5 of the in each case dual-leaf pedestrian barriers 3 are centrally spaced far enough apart that in particular a human hand cannot become jammed therein.

The lateral boundaries 2, 2' consist substantially of a module rail 6 disposed on the floor, composed of pane-shaped lateral boundary elements 7 held by the module rail 6, and also of a sensor strip 8 which is disposed on the upper periphery of the lateral boundary elements 7 and have a cover serving as a handrail 9. Functional modules, such as in the present case control cabinets 10 having electrical apparatuses and a control unit, and also the activating elements 4 of the pedestrian barriers 3 are integrated in the lateral boundaries 2, 2'. Consoles 11 having reading units 12, 12' are disposed at the beginning of the corridors 1, 1' of the two passage control devices. The right-hand passage control device is equipped with an additional functional element which is designed as a recognition unit 13 for detecting biometric data. The reading unit 12 is substantially a scanner for scanning a passport, the assigned biometric data of which has to be verified by way of the recognition unit 13 in order to obtain access to the passage control device.

As is well known, a person (not illustrated) firstly has to place their passport onto the reading unit 12 and let it be scanned there, if appropriate on the recognition unit 13, which may be in the form of a monitor, the biometric data are compared, for example by means of facial recognition, whereupon, when passage is possible after a check has been performed by means of a control unit contained in the control cabinet 10, the blocking elements 5 of the first pedestrian barrier 3 at the beginning of the corridor 1 are pivoted into a passing position (not illustrated) and access is granted for the relevant person into the lock or the passage control device. Then, the first pedestrian barrier 3 at the beginning of the corridor 1 closes again, whereupon the second pedestrian barrier 3 at the end of the corridor 1 opens and the relevant person can leave the lock again. It is a prerequisite for the opening of the second pedestrian barrier 3 at the end of the corridor 1, however, that only one person and, if appropriate, their item of luggage is located in the lock. This is controlled via light barriers (not illustrated here) in the module rail 6 and in the sensor strip 8.

Figure 2:
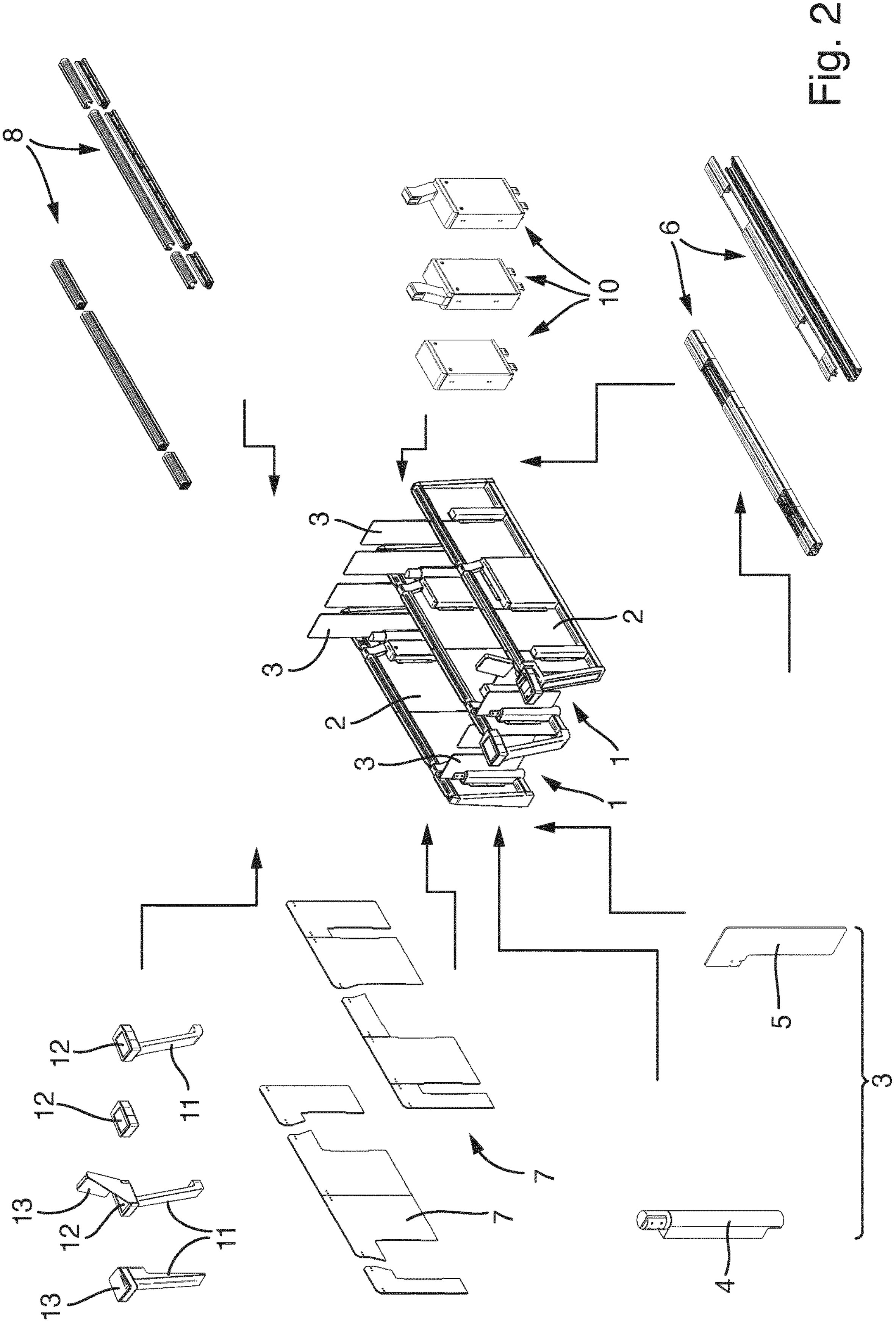
FIG. 2 shows a schematic illustration of the modular construction mode of the passage control station from FIG. 1.

FIG. 2 schematically highlights the modular construction mode of the two passage control devices from FIG. 1, said modular construction mode being composed substantially of the module rail 6, the control cabinets 10, the sensor strip 8, the consoles 11, reading units 12 and recognition unit 13, the lateral boundary elements 7 and the pedestrian barriers 3, the latter for their part being assembled from in each case two activating elements 4 and two blocking elements 5.

Figures 3A, 3B, 3C:
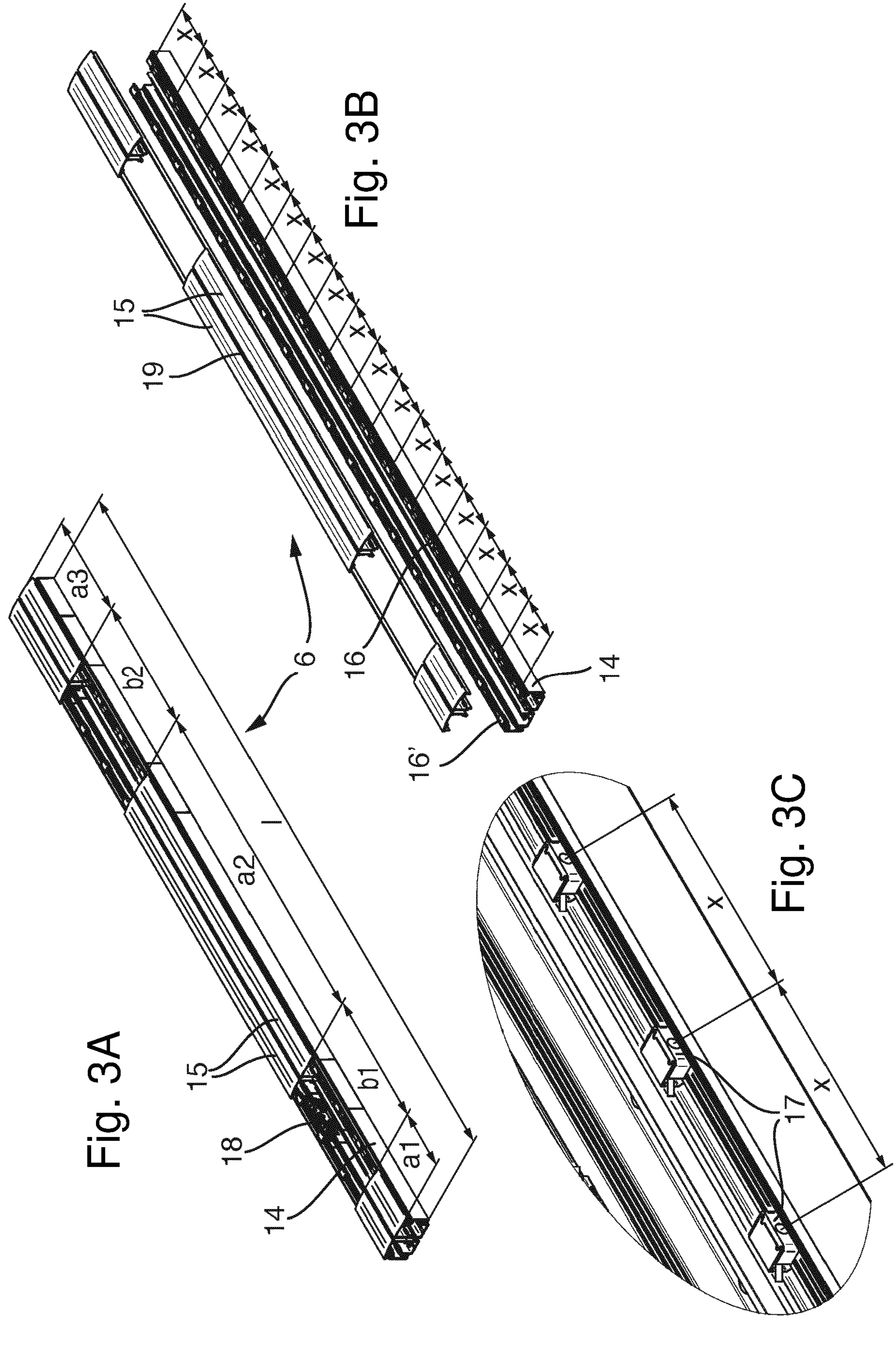
FIGS. 3A and 3B show an enlarged illustration of the module rail from FIG. 2.
FIG. 3C shows an enlargement of the detail from FIG. 3B.

The module rail 6 illustrated in more detail in FIGS. 3A to 3C, and is illustrated in the assembled state in FIG. 3A and in the disassembled state in FIG. 3B. FIG. 3C is an enlargement of the detail from FIG. 3B.

It becomes obvious in FIG. 3B that the module rail 6 is assembled from three extruded aluminum profiles: A first extruded profile 14 is completed with two second extruded profiles 15 that are pushed longitudinally into the first extruded profile 14 so as to form the module rail 6 illustrated in FIG. 3A. As can likewise be seen here, the second extruded profiles 15 cover the first extruded profile 14 only in parts of the length L of the module rail 6, specifically in the sub-portions a1, a2 and a3. The gaps or windows, denoted by b1 and b2, in the upper extruded profiles 15 serve as specifically adapted receptacles for functional modules which are inserted from above into the module rail 6, said functional modules here being in particular control cabinets 10 (not illustrated in this Figure).

As is shown in FIG. 3B and the enlargement of a detail in FIG. 3C, the module rail 6 contains a predefined pitch having the pitch dimension x. A plurality of specifically adapted receptacles 16 for functional elements, here light barriers 17, which are equidistantly distributed over the entire length L of the module rail 6 and simply snap-fitted into the lower extruded profile 14 are provided in this pitch. Receptacles 16' which are likewise disposed at the pitch x and form only part of a specifically adapted receptacle for functional modules can be seen on the side of the first extruded profile 14 that points toward the rear in FIG. 3B. Holding elements 18 (cf. FIG. 3A) which complete the receptacles 16 so as to form a specifically adapted receptacle for a functional module, here are pedestrian barrier (not illustrated) may be attached to these receptacles 16'.

The second extruded profiles 15 of the module rail 6 moreover form receiving grooves 19 for the lateral boundary elements 7 which are simply plugged into the receiving grooves 19.

Figure 4A:
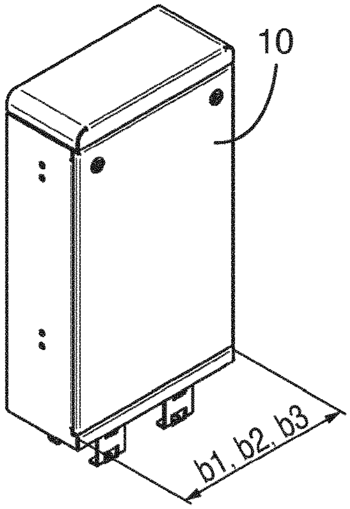
FIGS. 4A to 4C show an enlargement of control cabinet examples from FIG. 2.
Figure 4B:
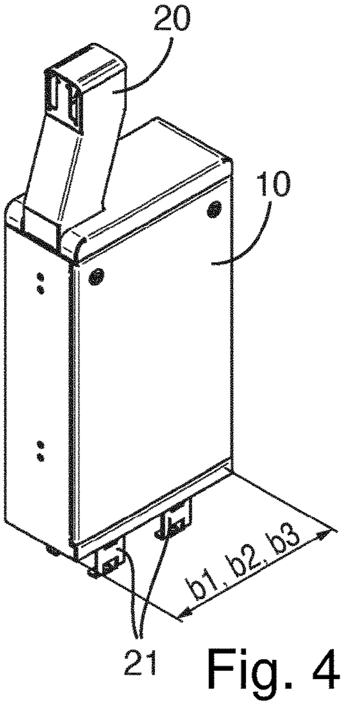
Figure 4C:
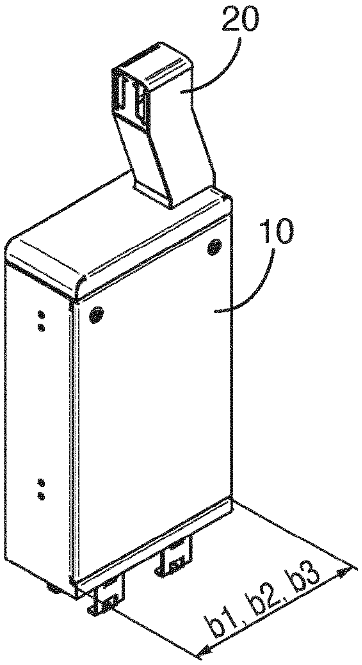

FIGS. 4A to 4C show three different control cabinets 10 as functional module for attaching to the module rail 6. Said control cabinets 10 differ in terms of the presence and the orientation of a signal cable duct 20 which the actual control cabinet 10 to the sensor strip 8, the latter being interrupted by the signal cable duct 20, is provided.

Mounting feet 21 can be seen on the lower side of the control cabinet 10, said mounting feet 21 conjointly with holding elements 18 being able to be fastened to the non-specific receptacles 16 which are attached to the module rail 6 at the pitch x. The control cabinet 10 here stands on the module rail 6, this being obvious in particular in FIG. 1, such that said control cabinet 10 does not impede the light barriers 17.

The reference signs b1, b2, b3 in FIGS. 4A to 4C indicate that the control cabinet 10 in this exemplary embodiment is available in three different sizes.

Figures 5A, 5B:
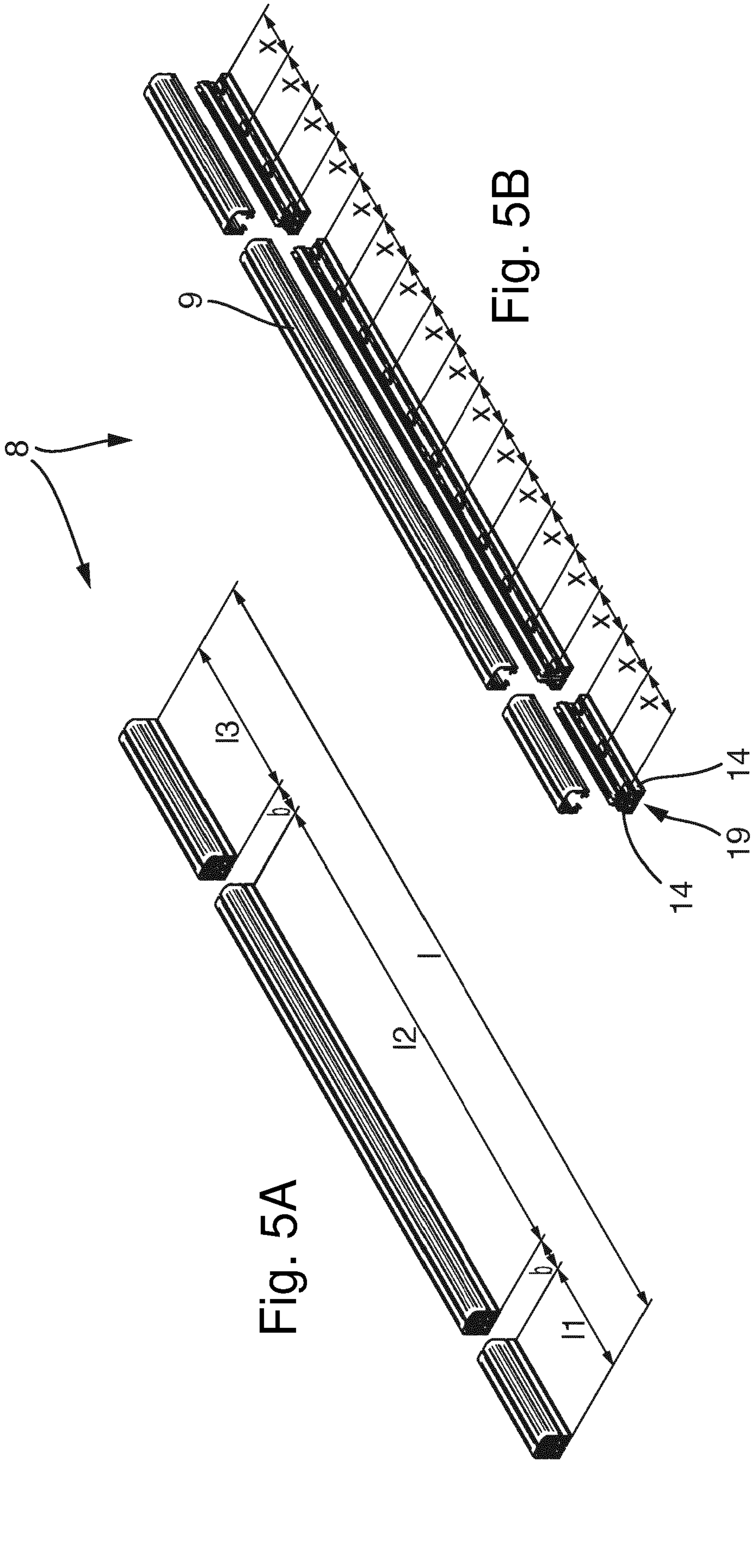
FIG. 5 shows an enlargement of the illustration of sensor strips from FIG. 2.

FIGS. 5A and 5B show the sensor strip 8 which is disposed on the upper periphery of the lateral boundaries 2 and optionally interrupted by the signal cable duct 20 of a control cabinet 10. The sensor strip 8 consists of two first extruded profiles 14 which on the lower side configure a receiving groove 19 for the lateral boundary elements 7 (cf. FIG. 5B), and also a cover that is placed on this extruded profile 14 and for its part is configured as a profile and can also serve as handrail 9.

The sensor strip 8 is also, at a predefined pitch having the pitch dimension x, provided with receptacles in which light barriers are inserted equidistantly over the entire length of the sensor strip 8.

FIGS. 6A to 6C show four different variants of scanning apparatuses 12, 13 that can be attached, with or without a console 11, to the front end of the lateral boundaries 2. The variant illustrated in FIG. 6A is particularly suitable for integration in a lateral boundary 2, for example in order to request biometric data inside the lock that is formed by two pedestrian barriers 3 at the beginning and the end of the corridor 1.

FIG. 7 in an exemplary manner shows the lateral boundary elements 7 having a height h and a length 1, wherein said lateral boundary elements 7 are provided for the left-hand lateral boundary 2 and the right-hand lateral boundary 2 of the first passage control device, which is illustrated on the right in FIG. 1. Corresponding receptacles for control cabinets 10 and activating elements 4 of the pedestrian barriers 3 can be seen. The lateral boundary elements 7 are transparent or translucent panes.

Figure 8:
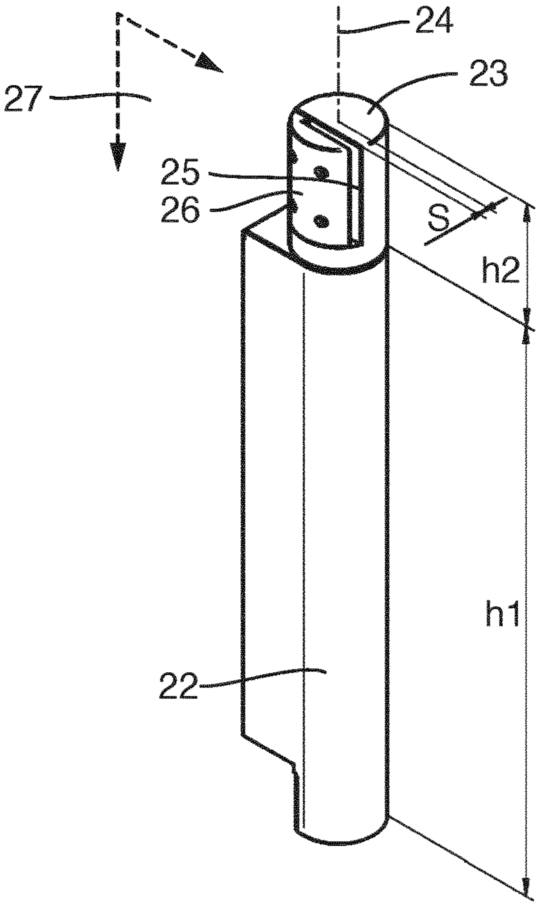
FIG. 8 shows an enlarged illustration of an activating element of a pedestrian barrier from FIG. 2.
Figure 9:
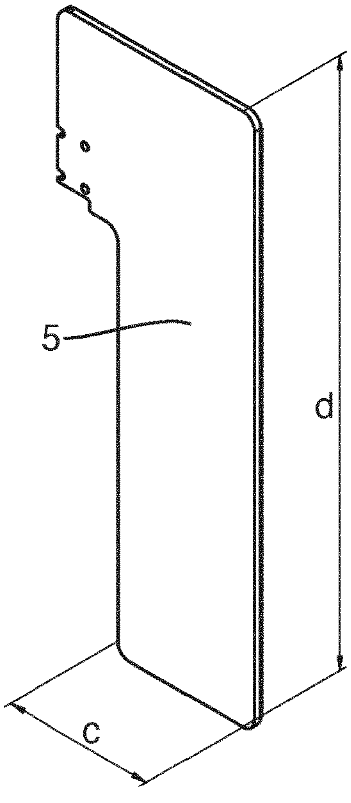
FIG. 9 shows an enlarged illustration of a blocking element of a pedestrian barrier from FIG. 2.

FIG. 8 shows part of a pedestrian barrier 3, specifically the activating element 4 to which the blocking element 5 (not illustrated here) is fastened. The blocking element 5 configured as a transparent or translucent pane can be seen in FIG. 9.

As is highlighted in FIG. 8, the activating element 4 also consists of a plurality of parts: a base part 22 and a holding part 23. The base part 22 is fixed to a lateral boundary 2 while the holding part 23 can rotate on the base part 22 about a vertical axis of rotation 24. A drive device for rotating the holding part 23 is disposed in the interior of the base part 22 (not visible here).

The holding part 23, in an eccentric manner or so as to be spaced apart from the axis of rotation 24, has a mounting face 25 on which the blocking element 5 can be placed and to which the blocking element 5 can be fastened by means of a mounting cover 26.

A blocking plane 27 which is defined by the mounting face 25 or by the rectilinear profile of the pane-shaped blocking element 5 is indicated by dashed arrows. The blocking plane 27 as well as the axis of rotation 24 are vertically aligned, thus being approximately mutually parallel, and are mutually spaced apart by a distance S.

On account of the construction of the illustrated activating element 4 and the shape of the blocking element 5, the activating element 4 can largely (height h) be rigidly configured, while the rotatable holding part 23 in comparison extends only over a very minor height h2, and thus the extent of the moving parts is minimized. As a result, not only can the risk of an accident be minimized, but the adjustment and also the mounting or dismounting of the blocking element 5 can also be kept simple.

Figure 10A:
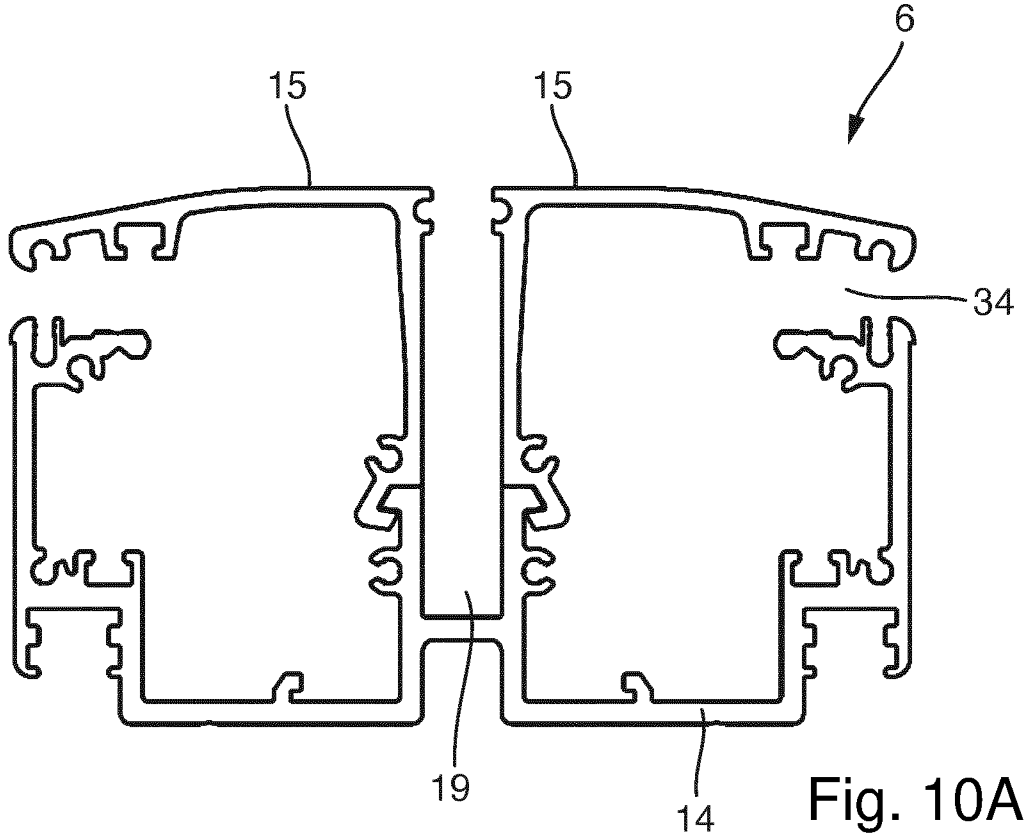
FIGS. 10A and 10B show in each case a section through a module rail.
Figure 10B:
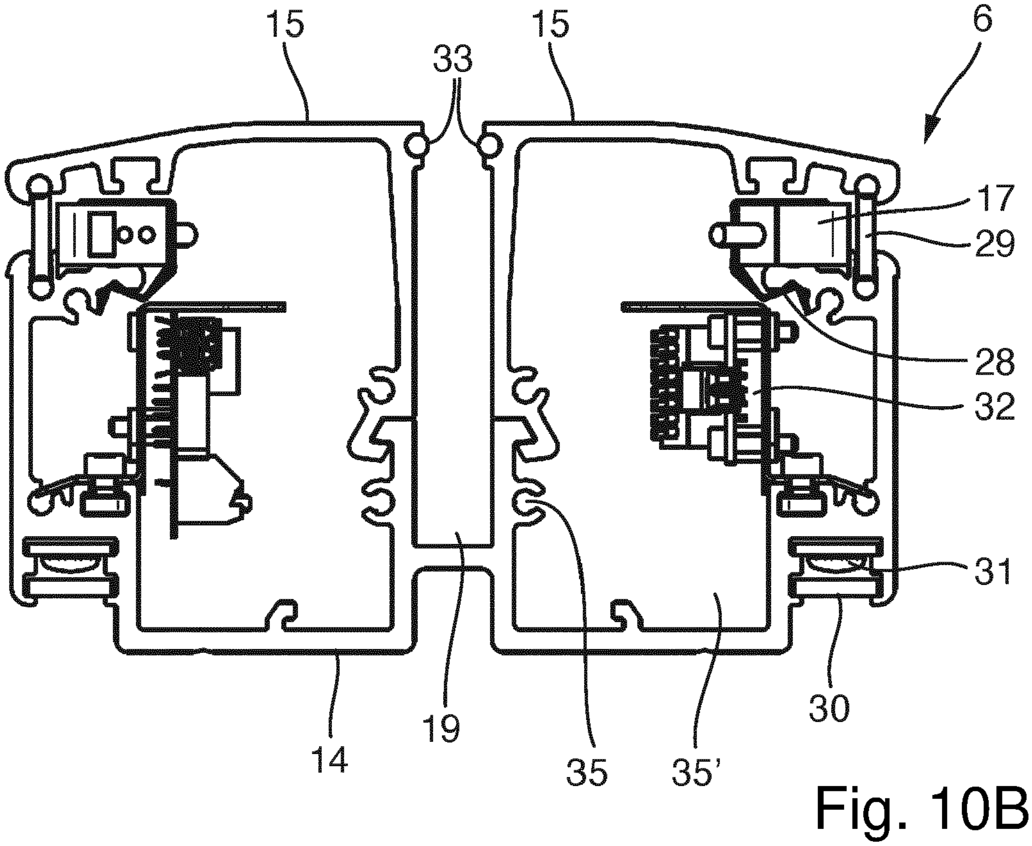

The module rail 6 is illustrated in cross section in FIG. 10A. The same illustration can be found in FIG. 10B, but different attachment parts can be seen in the latter.

The mutual latching of the second extruded profiles 15 and the first extruded profile 14 can be particularly readily seen in FIG. 10A. As is obvious in particular in FIG. 10B, the extruded profiles 14, 15 are profiled in such a manner that functional elements can be easily installed. For example, the light barriers 17 or other sensors are thus snap-fitted (by means of a spring element 28) into one of the second extruded profiles 15, and a translucent strip 29 for protecting the light barriers 17 is inserted longitudinally.

A light strip 30 having LEDs 31 is likewise inserted longitudinally, wherein the receptacle therefor is provided in the first extruded profile 14. Electrical contacting elements 32 or connecting elements and also signal cable ducts and the like are likewise contained in the first extruded profile 14. Sufficient free space which serves as a cable duct, in particular for one or a plurality of mains cables, remains within the profile of the module rail 6.

The two second extruded profiles 15, centrally and conjointly with the first extruded profile, form a receiving groove 19 for the lateral boundary elements 7 which to this extent only have to be plugged in here. Two seals 33 which are placed in corresponding receptacles of the second extruded profiles 15 support the lateral boundary elements 7 (not illustrated here) when the latter are inserted into the receiving groove 19.

Figure 11:
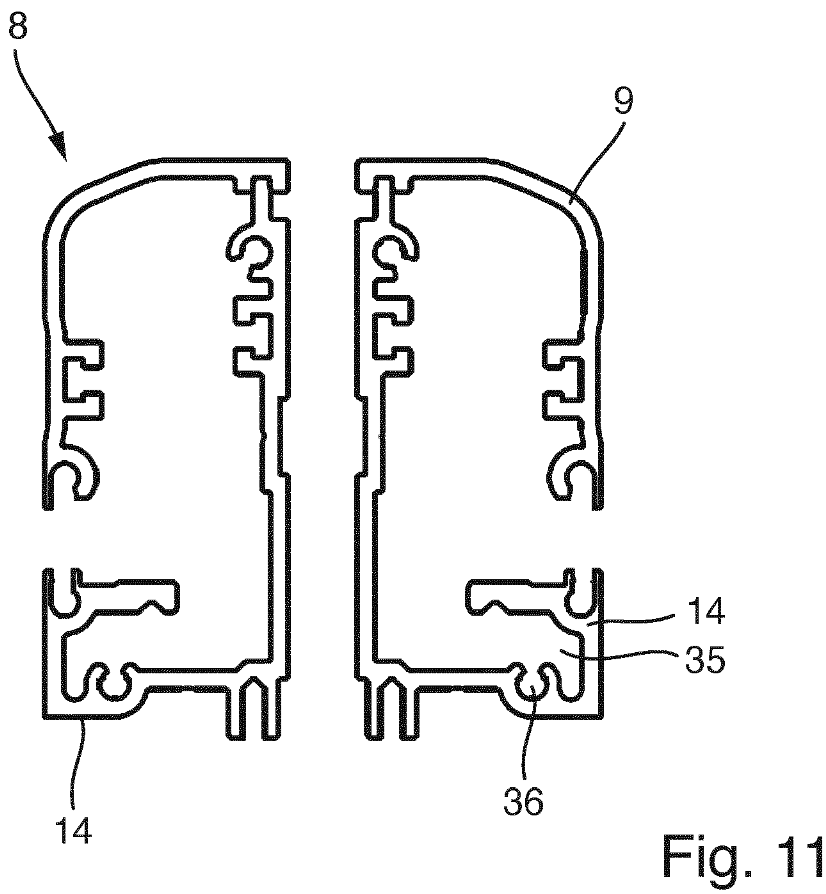
FIG. 11 shows a section through a sensor strip.

In a corresponding cross-sectional illustration, FIG. 11 shows the sensor strip 8 which consists of two (first) extruded profiles 14 and a cover (handrail 9) placed thereon. Here too, due to the shape of the cross section, there are receptacles and brackets as well as cable ducts 35 and screw ducts 36.

The invention claimed is:

1. A passage control device, comprising:
- a corridor (1);
- at least one pedestrian barrier (3) having at least one blocking element (5) that is disposed in a region of the corridor (1) and is movable between a blocking position and a passing position, in order to release or block the corridor (1) for passage;
- lateral boundaries (2) disposed on right and left sides of the corridor (1); the lateral boundaries (2) including a floor-proximal module rail (6) that comprises receptacles configured to receive at least one of functional elements or functional modules of the access control device;
- the receptacles include at least one sensor receptacle configured to receive at least one of equidistantly disposed sensors or radiation sources; and
- wherein the receptacles are located at a predefined pitch dimension, and specifically adapted ones of the receptacles that are configured to receive functional elements having an extent in a longitudinal direction of the module rail (6) that is larger than the pitch dimension are disposed above the at least one sensor receptacle.

2. The passage control device as claimed in claim 1, wherein the module rail (6) further comprises receptacles that are configured to receive board-shaped or pane-shaped lateral boundary elements (7).

3. The passage control device as claimed in claim 1, wherein the module rail (6) further comprises integrated cable ducts (35).

4. The passage control device as claimed in claim 3, wherein the module rail (6) further comprises at least one of cable conduits or prepared connector locations at a predefined pitch.

5. The passage control device as claimed in claim 1, wherein the module rail (6) further comprises anchoring installations configured for floor mounting.

6. The passage control device as claimed in claim 1, wherein the pedestrian barrier (3) is assembled from the at least one blocking element (5) and an activating element (4), and the activating element (4) contains an integrated drive installation for adjusting the at least one blocking element (5) between the blocking position and the passing position.

7. The passage control device as claimed in claim 6, wherein the blocking element (5) is fastened to the activating element (4) and is pivotable thereby about a vertical axis of rotation (24) between the blocking position and the passing position, and the blocking element (5) is configured such that said blocking element (5) in a vertical projection has a substantially rectilinear profile and defines a vertical blocking plane (27) which does not include the vertical axis of rotation (24).

8. The passage control device as claimed in claim 7, wherein the blocking element (5) is fastened to the activating element (4) eccentrically with respect to the vertical axis of rotation (24).

9. The passage control device as claimed in claim 7, wherein the activating element (4) is configured as a vertically oriented column and is assembled from a stationary base part (22) and a holding part (23) which is rotatable relative to said base part (22) and to which the blocking element (5) is fastened.

10. The passage control device as claimed in claim 1, wherein the receptacles include receptacles (16) located at a predefined pitch and configured for mounting at least one of a drive installation or an activating element (4) of the pedestrian barrier (3).

11. The passage control device as claimed in claim 1, wherein the module rail (6) consists of an extruded aluminum profile.

12. The passage control device as claimed in claim 1, wherein the lateral boundaries (2) in a region of an upper periphery thereof are provided with a sensor strip (8).

13. The passage control device as claimed in claim 12, wherein the sensor strip (8) is provided with at least one sensor receptacle configured to receive at least one of equidistantly disposed sensors or radiation sources.

14. The passage control device as claimed in claim 12, wherein the sensor strip (8) at a predefined pitch is provided with respectively specifically adapted receptacles (16) configured to receive additional functional elements of the access control device.

15. The passage control device as claimed in claim 12, wherein the sensor strip (8) includes integrated cable ducts.

16. The passage control device as claimed in claim 12, wherein the sensor strip (8) further comprises a handrail (9).

17. A passage control station having at least first and second ones of the passage control devices as claimed in claim 1, wherein the left-side lateral boundary of the first passage control device is at a same time the right-side lateral boundary of the second passage control device.

18. A passage control device, comprising:

a corridor (1);

at least one pedestrian barrier (3) having at least one blocking element (5) that is disposed in a region of the corridor (1) and is movable between a blocking position and a passing position, in order to release or block the corridor (1) for passage;

lateral boundaries (2) disposed on right and left sides of the corridor (1); the lateral boundaries (2) including a floor-proximal module rail (6) that comprises receptacles configured to receive at least one of functional elements or functional modules of the access control device; and wherein the receptacles further comprise receptacles configured for mounting a console having scanning apparatuses.

19. A parts kit for the passage control device as claimed in claim 1, comprising at least one of the pedestrian barriers (3) which is assembled from the blocking element (5) and an activating element (4) having an integrated drive device, the lateral boundaries (2) for forming the corridor (1), the module rail (6) for each of the lateral boundaries (2), said module rail (6) being provided with the receptacles located at a predefined pitch and being configured to receive at least one of functional elements or functional modules of the access control device with the receptacles including at least one sensor receptacle configured to receive at least one of equidistantly disposed sensors or radiation sources, and a sensor strip (8) for each of the lateral boundaries, wherein specifically adapted ones of the receptacles that are configured to receive the at least one of functional elements or functional modules having an extent in a longitudinal direction of the module rail (6) that is larger than the pitch dimension are disposed above the at least one sensor receptacle.

20. The parts kit as claimed in claim 19, wherein the functional modules are selectively made in different sizes.

* * * * *